United States Patent
Arlon

(10) Patent No.: US 7,452,112 B2
(45) Date of Patent: Nov. 18, 2008

(54) ENERGY ABSORBING HEADLIGHT FOR A MOTOR VEHICLE AND A METHOD OF ABSORBING THE ENERGY PRODUCED BY PEDESTRIAN IMPACT

(75) Inventor: Philippe Arlon, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/244,502

(22) Filed: Oct. 5, 2005

(65) Prior Publication Data

US 2006/0072332 A1 Apr. 6, 2006

(30) Foreign Application Priority Data

Oct. 5, 2004 (FR) .................... 04 10508

(51) Int. Cl.
*F21V 15/04* (2006.01)
(52) U.S. Cl. ................ 362/369; 362/390; 362/507; 362/509
(58) Field of Classification Search ........... 362/369, 362/390, 507, 509
See application file for complete search history.

(56) References Cited

U.S. PATENT DOCUMENTS

| | | | |
|---|---|---|---|
| 6,478,456 B1* | 11/2002 | Eichhorn et al. | 362/369 |
| 6,607,295 B2* | 8/2003 | Hayakawa | 362/517 |
| 2004/0012975 A1* | 1/2004 | Chase et al. | 362/505 |
| 2004/0136195 A1* | 7/2004 | Chase | 362/390 |

FOREIGN PATENT DOCUMENTS

| | | |
|---|---|---|
| DE | 10143676 | 3/2003 |
| EP | 1120309 | 8/2001 |
| EP | 1400404 A1 | 3/2004 |
| EP | 1400406 A1 | 3/2004 |
| EP | 1431116 | 6/2004 |
| FR | 2844755 | 3/2004 |

OTHER PUBLICATIONS

French Search Report dated May 18, 2005.

* cited by examiner

*Primary Examiner*—Sandra L. O'Shea
*Assistant Examiner*—Meghan K. Dunwiddie
(74) *Attorney, Agent, or Firm*—Morgan & Finnegan, LLP

(57) ABSTRACT

A headlight, in particular of the elliptical type for a motor vehicle, comprises a casing fixed on the vehicle; a protective cover glass closing off the casing; and an optical module which comprises a reflector, a lens and an intermediate fixed to the reflector and supporting the lens, the lens and intermediate constituting a rigid module.

The invention provides a headlight of this type which also includes means for absorbing at least some of the energy produced during impact with a pedestrian, by displacing at least part of the optical module.

The invention also provides a method of absorbing at least some of the energy arising from impact between a pedestrian and a vehicle headlight.

16 Claims, 4 Drawing Sheets

ENERGY ABSORBING HEADLIGHT FOR A MOTOR VEHICLE AND A METHOD OF ABSORBING THE ENERGY PRODUCED BY PEDESTRIAN IMPACT

FIELD OF THE INVENTION

This invention relates to a headlight, in particular one of the elliptical type, for a motor vehicle, which is adapted to offer a pedestrian improved safety in the event of impact with the pedestrian, by absorbing some of the energy produced by the impact. In particular, the invention proposes a headlight in which the rigid elements of the headlight are displaced so that they are not in the line of impact between the pedestrian and the headlight.

The invention also relates to a method which permits the successive absorption of a part of the energy arising from the impact between a pedestrian and the headlight of the vehicle, so as to minimize the effect of the impact on the pedestrian.

The invention has applications in the automotive field, and in particular in the field of headlights for motor vehicles, having regard to the European Standard relating to pedestrian safety.

STATE OF THE ART

In the field of headlights for motor vehicles, there is a European Standard the aim of which is to protect the headlight during impact between a pedestrian and a vehicle, and in particular with the headlight which is situated in the front face of the vehicle. The object of this Standard is to increase the safety of the pedestrian in the event of impact with a vehicle headlight, so as to limit the effects of the impact on the pedestrian.

FIG. 1 shows, in side view, the front part of a motor vehicle 1 having a headlight 2, which is for example of the elliptical type. In the event of pedestrian impact, that is to say in the event of an impact between a pedestrian and the vehicle, the head of the pedestrian, in particular when the latter is a child, may crash against the headlight and break the protective cover glass of the headlight. Now behind this protective cover glass, the headlight includes rigid elements which together constitute a rigid module. This rigid module is potentially a hard, and therefore dangerous, point of contact for the head of the pedestrian.

FIG. 2 shows an example of a headlight 2 of the elliptical type. This elliptical headlight comprises a casing 3 which is fixed on the vehicle and which is closed by a protective glass 4. It also includes an optical module which comprises a reflector 5, generally made of a metallic material, a lens 6 which is generally made of glass, and an intermediate support member 7 which is generally made of metal. This intermediate support member, which is more simply called the intermediate, provides a mechanical connection between the reflector 5 and the lens 6. It will be understood that the glass lens 6 and the metal intermediate 7 are rigid elements which are potentially very dangerous for the pedestrian, and in particular for the pedestrian's head, in the event of impact.

FIG. 2 shows, in the form of a circular arc P, the head of a pedestrian crashing with a force F against the headlight 2 of the vehicle. The line of impact between the pedestrian and the headlight, which is represented as a broken line in FIG. 2, shows that, on impact with a pedestrian, the first element encountered by the latter is the protective cover glass 4, and then, if the protective cover glass breaks, the lens 6 and intermediate 7. The pedestrian then comes into violent contact with rigid and undeformable elements. As a consequence, it is the pedestrian himself who absorbs the energy produced by the impact.

DISCUSSION OF THE INVENTION

Accordingly, the object of the invention is to provide a remedy for the disadvantages of the arrangements described above. To this end, the invention proposes a headlight, which is for example of an elliptical type and in which at least some of the energy arising from the said impact is absorbed by the headlight. For that purpose the invention proposes a headlight in which at least a part of the optical module is able to be displaced in such a way that the rigid module is not in the line of impact between the pedestrian and the headlight.

More precisely, the invention provides a headlight, especially a headlight of the elliptical type for a motor vehicle, comprising:
a casing fixed on the vehicle,
a protective cover glass closing off the casing and
an optical module comprising a reflector, a lens and an intermediate fixed to the reflector and supporting the lens, the said lens and the said intermediate constituting a module, which includes means for absorbing at least some of the energy produced during impact with a pedestrian, by displacement of at least part of the optical module.

The invention may also include one or more of the following features:
the energy absorbing means comprise a position corrector which is mounted between the casing and the optical module, whereby to ensure displacement of the optical module with respect to the casing;
the position corrector has an adjusting rod which is fixed with respect to the optical module and movable with respect to the casing;
the energy absorbing means comprise at least one coupling element which is mounted between the intermediate and the reflector, and which ensures displacement of the module with respect to the reflector; this coupling element is deformable or breakable;
the coupling element is constituted by the intermediate itself;
the intermediate is breakable where it is fastened to the reflector;
the energy absorbing means comprise an energy absorbing foam located at least underneath the module.

The invention also provides a method of absorbing at least some of the energy arising from an impact between a pedestrian and a vehicle headlight. This method comprises the following steps:
absorption of some of the energy by deformation of a protective cover glass of the headlight,
absorption of part of the energy by displacement of at least part of an optical module within the headlight, and
absorption of some of the energy by means of an absorbent foam.

The invention also provides a motor vehicle that includes a headlight of the kind set forth above.

DETAILED DESCRIPTION OF EMBODIMENTS OF THE INVENTION

The invention proposes a headlight, in particular of the elliptical type, which is adapted to absorb at least some of the energy which is produced during an impact between a pedestrian and a vehicle on which the headlight is mounted. In other words, the invention proposes a headlight which enables the energy generated by impact between a pedestrian and the vehicle to be dissipated in the most regular and gentle way possible, in order to minimize the amount of energy absorbed by the pedestrian. To this end, the headlight of the invention includes means which enable at least part of the optical module within the headlight to be displaced in the event of impact with a pedestrian.

Figure 3:
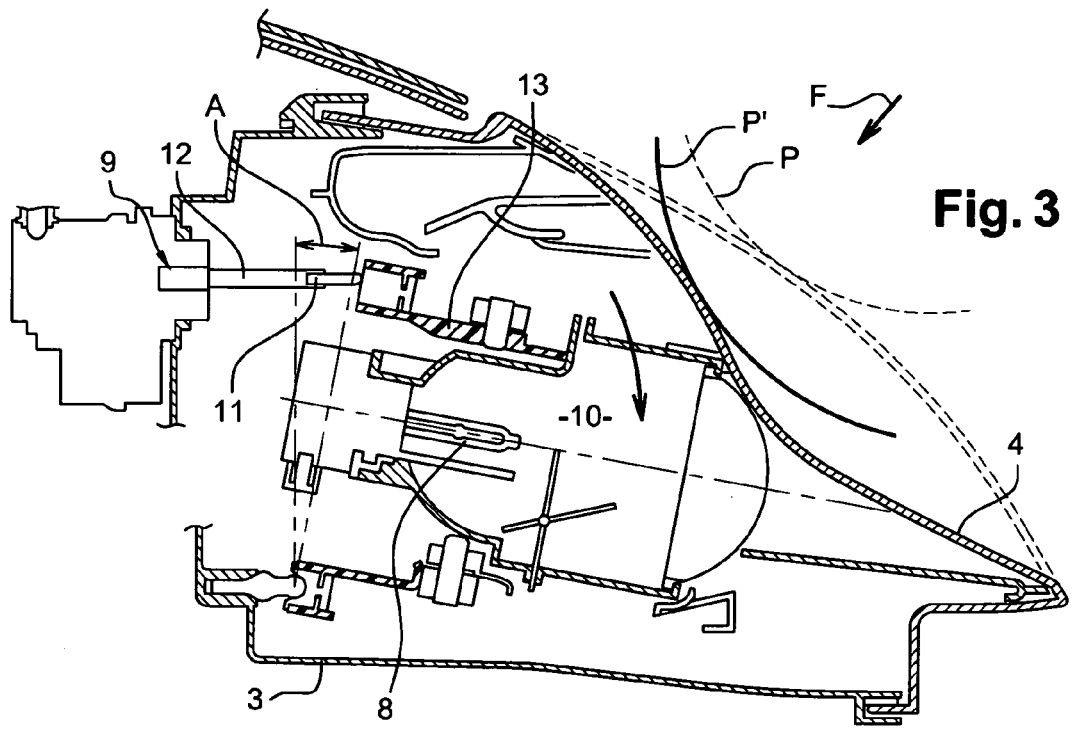
FIGS. 3 and 4 show, in cross section, a view of a headlight in a first embodiment of the invention.
Figure 4:
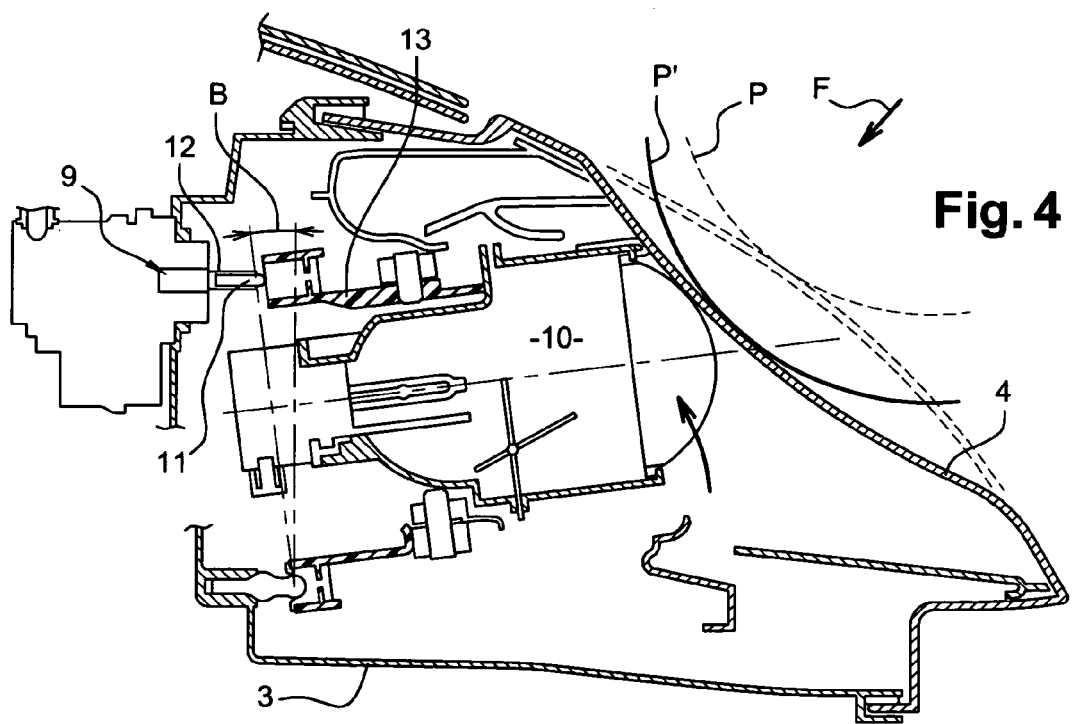

In a first embodiment of the invention, these means consist of a position corrector which ensures displacement of the optical module inside the headlight. This embodiment is shown in FIGS. 3 and 4. More precisely, FIG. 3 shows the headlight in a first example of a position of the corrector, while FIG. 4 shows the same headlight in a second example of a position of the corrector.

FIG. 3 shows an elliptical type headlight according to the invention. This headlight has a reflector 5, a lens 6 and an intermediate 7, which together constitute an optical module 10. Within the reflector 5, a light source 8 emits a light beam which is diffused by the optical system 10.

In this first embodiment, the headlight 2 includes a corrector 9. This corrector 9 is fixed, firstly on the casing 3 of the headlight, and secondly on the optical module 10. The corrector 9 is movable so as to enable the optical module 10 to be moved inside the headlight. Conventionally, the purpose of the corrector 9 is to adapt the position of the optical module to driving conditions (for example the loading of the vehicle, braking of the vehicle, and so on), so that the light beam will be propagated in the desired direction. In the invention, the function of the corrector 9 is to displace the optical module 10 vertically or horizontally, with this displacement ensuring at least partial absorption of the energy produced during impact between a pedestrian and the vehicle.

FIG. 3 shows, by way of circular arcs P and P', the head of a pedestrian during impact between the latter and the headlight. The broken circular arc P shows the pedestrian's head at the start of the impact with the headlight. The arc P' shown in bold represents the head of the pedestrian after the protective cover glass 4 has been broken. In this connection, the protective cover glass 4 of the headlight is made in a relatively flexible material, so that the said protective cover glass will undergo substantial deformation before breaking. This deformation enables some of the impact energy to be absorbed. Then, once the protective cover glass has broken, the displacement of the optical module 10 enables a further part of the impact energy to be absorbed. As to this, when the pedestrian P' comes into contact with the optical module 10, and in particular with the lens 6 of the module 10, the force F from the impact becomes reduced by the fact that the optical module is displaced at the same time as the person P'. The optical module 10 thus absorbs some of the energy from the impact.

In this first embodiment, the displacement of the optical module 10 is obtained by means of the corrector 9. For this purpose, the corrector 9 has an adjusting rod 11 which is fixed on the optical module 10 by means of an interposed module support member 13. This adjusting rod 11 is retractable. In other words, the adjusting rod 11 is movable in a guide tube 12 which is fixed on the casing 3. The adjusting rod 11 is thus able to move in and out of the guide tube 12, giving it a variable length in such a way as to enable the optical module to be displaced within the headlight.

The movable rod is preferably mounted so as to be rotatable on the module support member 13, whereby it enables the optical module 10 to be rotated. In this way, the optical module 10 is movable within the headlight both horizontally and vertically. FIG. 3 shows the headlight of the invention during impact with a pedestrian in the case where the adjusting rod 11 of the corrector 9 is in its "deployed" position, that is to say the position in which the rod 11 projects out of the guide tube 12. The optical module 10 is then displaced downwards. An angle A, shown in FIG. 3, represents the angular displacement performed by the optical module 10 during the impact with the person P.

FIG. 4 shows the headlight of the invention during impact with a pedestrian in the case where the adjusting rod 11 of the corrector 9 is in its "withdrawn" position, that is to say when the rod 11 is retracted into the guide tube 12. The optical module 10 is then displaced upwards. In FIG. 4, an angle B represents the angular displacement performed by the optical module 10 during the impact with the person P.

In a first modified version of the invention, retraction and deployment of the adjusting rod 11 are controlled by a spring system which contracts or expands.

In a second modified version of the invention, the corrector 9 is controlled by at least one motor. The retraction or deployment of the adjusting rod 11 is then controlled by this motor. More precisely, at the moment of impact, an electric pulse is transmitted to the motor, which displaces the adjusting rod 11 from its initial position to a predetermined final position. This displacement of the adjusting rod 11 causes the optical module to be displaced. Since the displacement of the optical module is controlled by the motor, it ensures that the impact is damped out. In other words, it reduces the impact force, which leads to a reduction in the energy absorbed by the pedestrian.

Accordingly, the corrector enables the energy of the impact to be taken out by moving the optical module away from the centre of the impact. It is therefore the optical module and the corrector that absorb some of the energy produced by the impact with the pedestrian.

Figure 5:
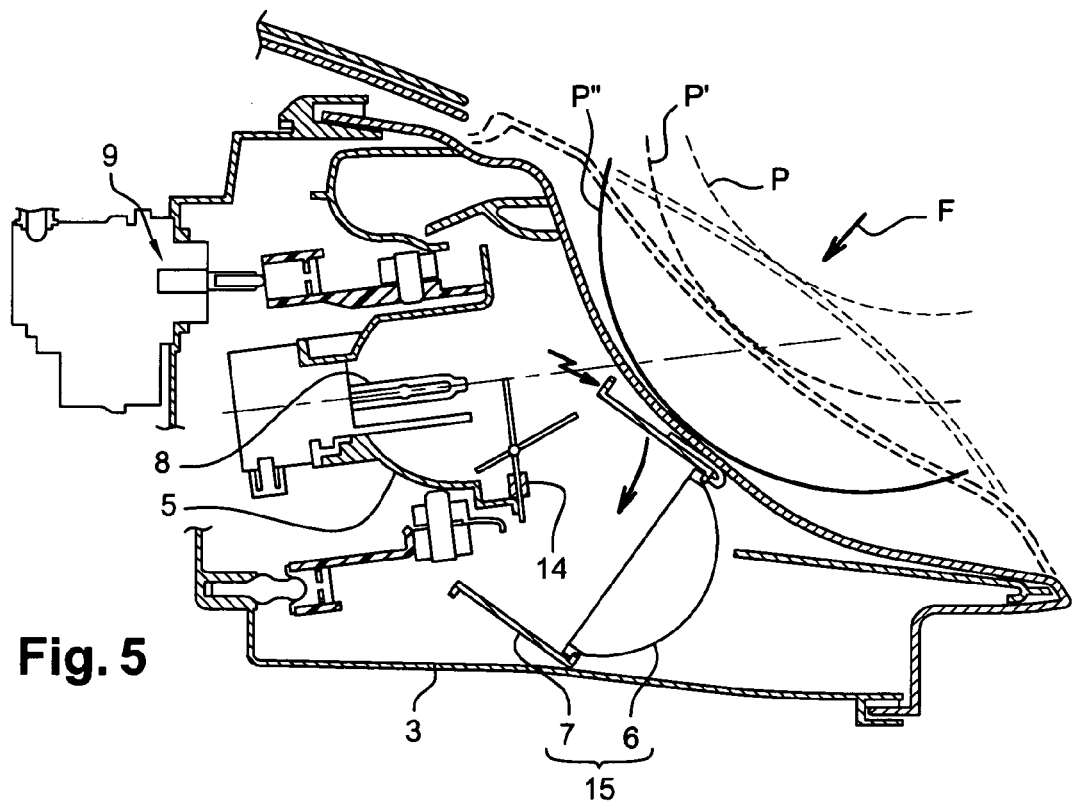
FIG. 5 shows, in cross section, a view of a headlight in a second embodiment of the invention.

In a second embodiment of the invention, the means for displacing at least part of the optical module consist of a coupling element which is fixed between the intermediate 7 and the reflector 5. In the event of impact with a pedestrian, this coupling element displaces part of the optical module within the headlight. This embodiment is shown in FIG. 5.

In this second embodiment of the invention, the intermediate 7 is fixed on the reflector 5 by means of a connecting element 14. In this way, the optical module is divided into two parts, namely:
  the reflector 5, and
  a rigid module 15 which comprises the lens 6 and intermediate 7.

The rigid module 5 is the more rigid part of the headlight, and therefore the most dangerous for a pedestrian.

The coupling element 14 is an element which is adapted to separate the intermediate 7 and reflector 5 from each other in the event of an impact. Its function is to fix the intermediate 7 and the reflector 5 together and therefore to connect the rigid module 15 and reflector 5 together when they are in normal operation, and to ensure the rigid module 15 is broken away from the reflector 5 when there is an impact.

In a modified version of the invention, this coupling element 14 is deformable. The effect of this is that the coupling between the rigid module 15 and reflector 5 is modified. This coupling element may for example be made of a material of a rubber type, which is deformable under the effect of a force. In this modified version, in the event of an impact the coupling element 14 is deformed in such a way that the rigid module 15 displaces the casing 3 downwards without detaching itself completely from the reflector 5. It will therefore be understood that when impact with a pedestrian occurs on the optical module 10, the rigid module 15 is displaced downwards, thereby reducing the impact force.

In a further modified embodiment of the invention, the coupling element 14 is detachable, that is to say it is arranged to break in the event of an impact. The coupling element 14 may for example be in the form of a breakable screw and nut system which is ruptured under the effect of a force. For example, the screw thread may be stripped under the effect of the impact, so loosening the nut. This version is shown in FIG. 5. More precisely, FIG. 5 shows the rigid module 15 after the coupling element 14 has been ruptured. The rigid module 15 is shown positioned on the lower face of the casing 3. In this way, the more rigid part of the headlight, and therefore the part which is more dangerous for the pedestrian, is displaced the furthest down, so as not to provide stiffening during the impact. In addition, by accompanying the pedestrian in its path of movement, the rigid module absorbs some of the energy from the impact.

In yet another modified version, the coupling element is an integral part of the intermediate, that is to say it is formed with the intermediate during manufacture of the intermediate. For example, the intermediate may be made of a plastics material such that it can be broken when a stress exceeds a predetermined threshold value. In a further example, the intermediate includes pegs which are received in apertures formed at the front end of the reflector, the intermediate being fixed on the reflector by upsetting of these pegs in such a way that the pegs will break when an impact occurs on the lens or the intermediate.

In these examples, the intermediate or its fastening means is broken in such a way that the front part of the module 15 is displaced towards the bottom of the casing 3, thereby reducing the impact force.

The second embodiment described above may be combined with the first embodiment of the invention in which the corrector is able to be modified.

FIG. 5 shows the second embodiment associated with the first embodiment. In this example, the corrector is in its withdrawn position when the rupture of the coupling element occurs. In other words, FIG. 5 shows both the position corrector 9 and the coupling element 14 at the same time. It will be understood from FIG. 5 that the impact force from the pedestrian colliding with the headlight 2 is damped firstly by the flexibility of the protective cover glass 4 (see the circular arc P in fine broken lines), and then by the displacement of the optical module 10 which is produced by the corrector 9 (see the circular arc P' shown in thick broken lines), and then by rupture of the coupling element 14 which causes the rigid module 15 to fall (see the circular arc P'' in bold continuous lines).

In a third embodiment of the invention, the headlight 2 includes a block of energy absorbing foam which is placed under the optical module. This third embodiment is shown in FIGS. 6 and 7.

Figure 6:
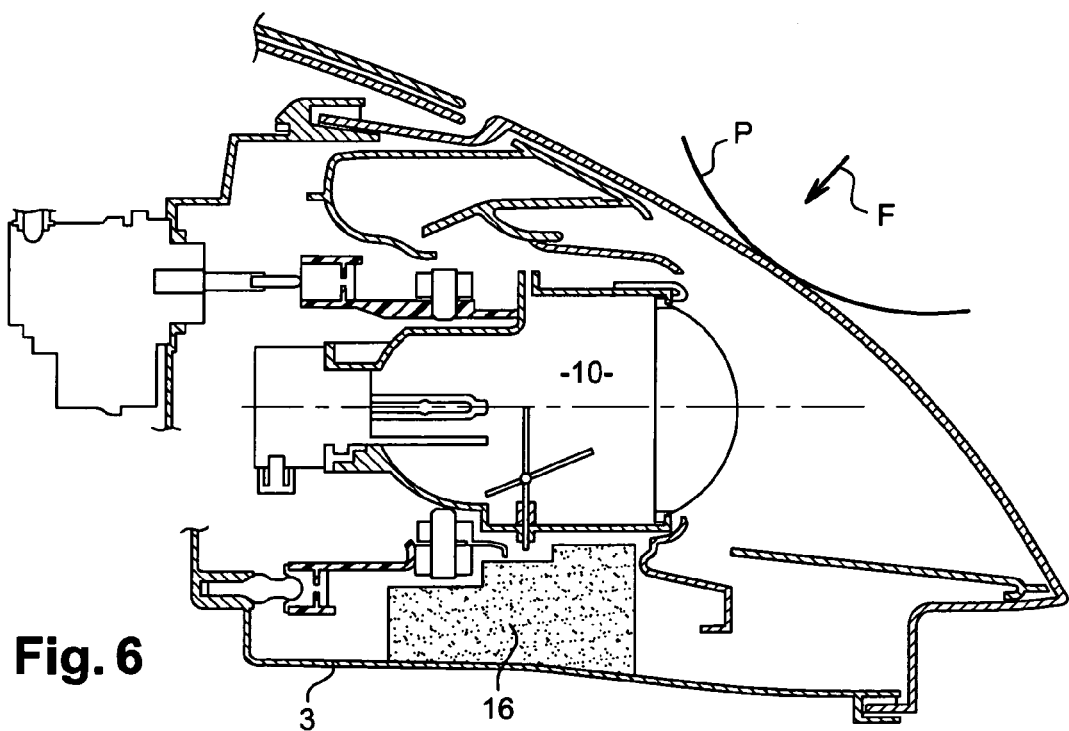
FIG. 6 shows, in cross section, a view of a headlight in a third embodiment of the invention.
Figure 7:
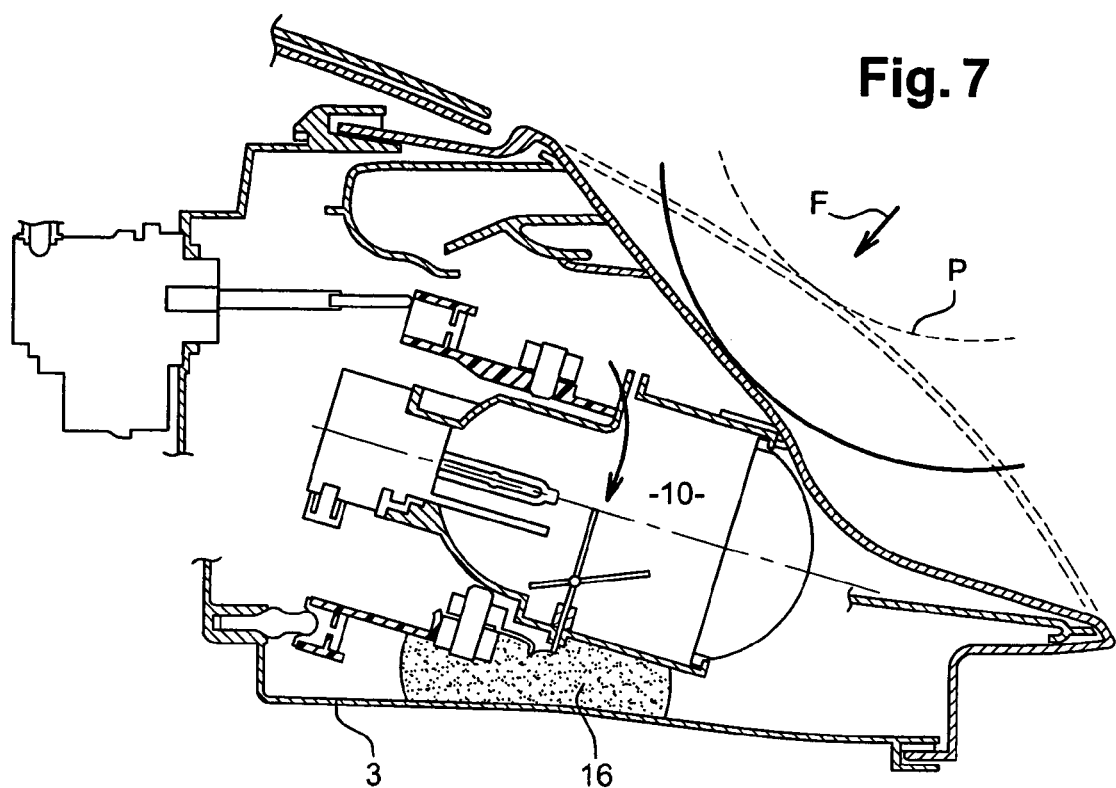
FIG. 7 shows, in cross section, a view of a headlight which combines the first and third embodiments of the invention.

FIG. 6 shows the headlight in normal operation, that is to say with no impact. FIG. 6 shows the foam block 16 located underneath the optical module 10. The foam block 16 is calibrated in such a way as to absorb at least part of the energy which is due to deformation of the headlight, that is to say due to the displacement of the optical module 10 or the rigid module 15 inside the headlight.

In a modified version, the foam block 16 may be a uniform block which is located at the bottom of the casing 3. In a further modified version which is shown in FIG. 6, the foam block 16 has a form which is matched to the outer contour of the optical module, in such a way that it is as close as possible to the module and is in contact with the module as quickly as possible after impact has taken place. The thicker the foam block at the point of deformation, the greater will be the absorption of energy.

It will be understood that the effect of the rigidity of the rigid module is limited so long as the module does not encounter another rigid element, and in particular a wall of the casing 3. The foam block 16 delays the instant at which this connection takes place.

In the invention, the interval of time between the instant when the head of a pedestrian P comes into contact with the optical module 10 and the instant of impact between the optical module 10 and the casing 3 is made use of in order to absorb a part of the energy of the impact. Thus, the various stages in the collision which have been described in relation to FIG. 5, namely the yielding of the protective cover glass, the displacement of the optical module by the position corrector, and the displacement of the rigid module by the coupling element, are different means which are able to be employed, separately or in combination with each other, in order to delay the instant at which the rigid module 15 meets the casing 3. The displacement of the optical module 10 and the displacement of the rigid module 15 may be combined with the foam block 16 in order to absorb an even greater proportion of the impact energy.

Figure 1:
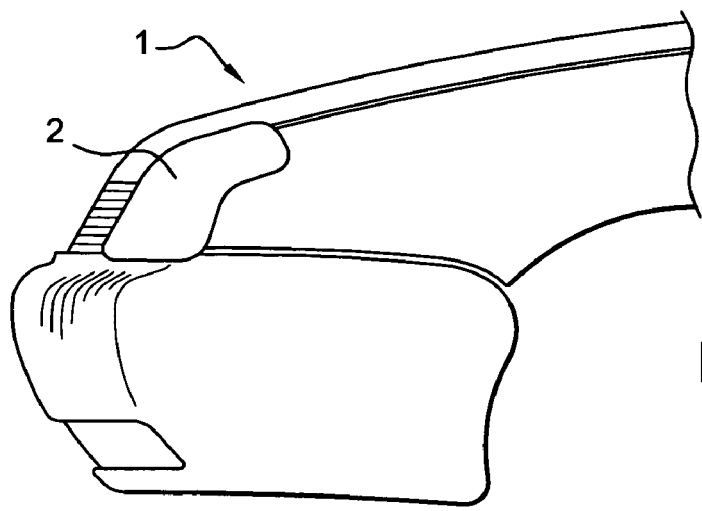
FIG. 1, already described above, shows diagrammatically a vehicle equipped with an elliptical type headlight.
Figure 2:
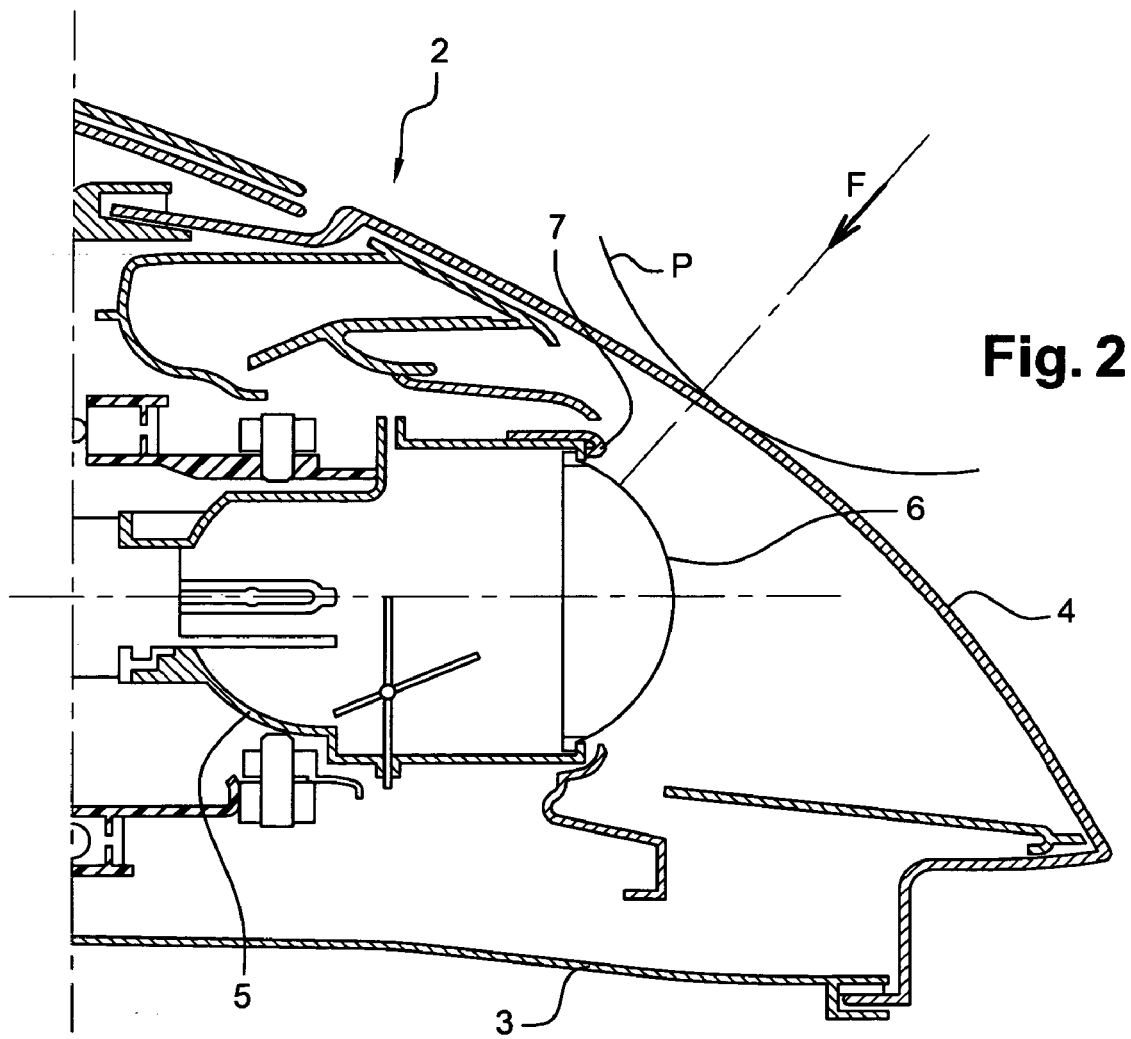
FIG. 2, already described above, is a view in cross section of a headlight of the conventional elliptical type.

FIG. 7 shows the headlight in the embodiment of FIG. 2 after impact has taken place, that is to say after the optical module 10 has been displaced. It will be seen in FIG. 7 that the foam block 16 is compressed by the optical module 10. More precisely, during the impact of the pedestrian on the optical module, the latter is displaced towards the bottom of the headlight by the corrector 9, and its displacement is damped out by the foam block, with absorption of energy.

The headlight of the invention thus enables at least part of the energy arising from an impact between a pedestrian and the headlight of the invention to be absorbed. A first part of this energy is absorbed by the protective cover glass of the headlight; in this connection, the protective cover glass of the headlight is made in a polycarbonate material which is able to deform before breaking. The protective cover glass therefore absorbs some of the energy due to the impact. However, the energy absorbed by the protective cover glass is not sufficient to protect the pedestrian, especially when the glass breaks, leaving the rigid module in contact with the person's head. Accordingly, the invention proposes to make use of the features of the headlight of the invention, for displacing the rigid module and/or the optical module in such a way that these modules will themselves also absorb some of the energy from the impact. The absorption of energy from the impact can then be improved by means of absorbent foam.

Figure 8:
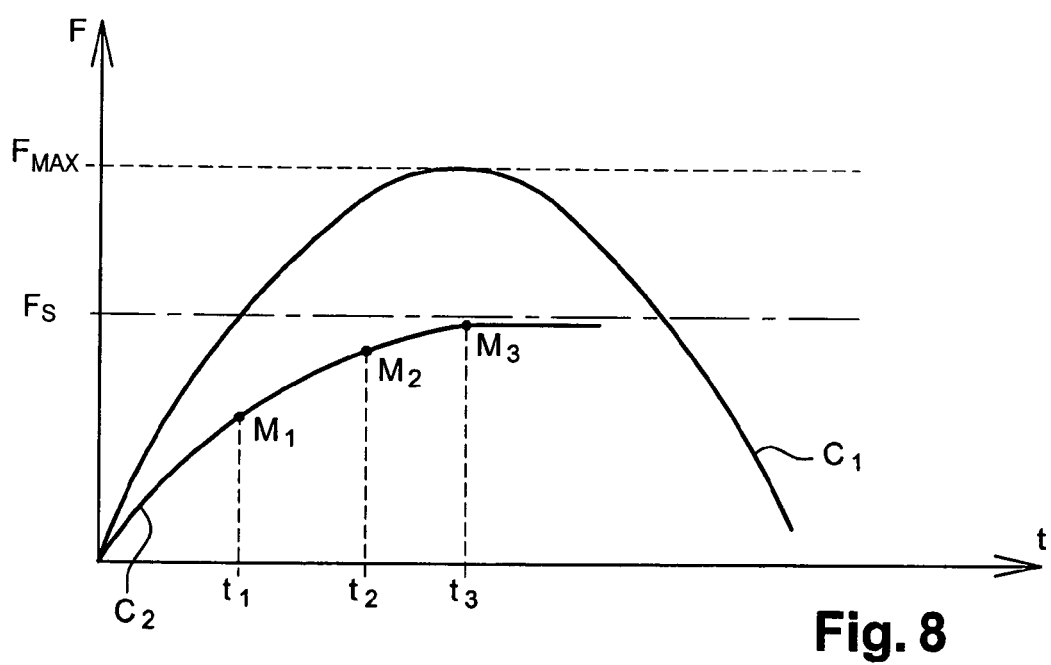
FIG. 8 shows an example of a curve for the energy produced by the impact of a pedestrian on a headlight according the invention.

FIG. 8 shows examples of energy curves obtained during impact of a pedestrian with a conventional headlight and with a headlight according to the invention. The curve C1 shows the variation in energy when a pedestrian collides against a conventional headlight. The peak of the curve C1, where the energy is $F_{MAX}$, corresponds to the impact with the rigid module. It can be seen that the maximum amount of energy permitted by the Standard ($F_S$) is greatly exceeded. Curve C2 shows the variation in energy when the impact occurs against the headlight of the invention. The points $M_1$, $M_2$ and $M_3$ correspond respectively to the instant $t_1$ at which the optical module is displaced by the corrector, the instant $t_2$ at which the rigid module is displaced by the coupling element, and the instant $t_3$ at which the rigid module meets the foam block. It will be seen that the energy from the impact is less intense in curve C2 than in curve C1. In particular, curve C2 never exceeds the energy level $F_S$.

What is claimed is:

1. A headlight for a motor vehicle, comprising:
   (a) a casing fixed on the vehicle,
   (b) a protective cover glass closing off the casing
   (c) an optical module comprising an elliptic type reflector, a converging lens and a lens holder coupled to the reflector and supporting the lens, the lens and the lens holder constituting a rigid module, and
   (d) a position corrector coupled to the casing and the optical module, which displaces the optical module relative to the casing when an impact force is exerted on the protective glass cover and optical module for absorbing at least some of the energy produced during impact.

2. A headlight according to claim 1, wherein the position corrector comprises an adjusting rod which is fixed with respect to the optical module and movable with respect to the casing.

3. A headlight according to claim 2, wherein the adjusting rod is retractable.

4. A headlight according to claim 1, further comprising at least one coupling element disposed between the lens holder and the reflector, which separates the rigid module with respect to the reflector when a sufficient impact force is exerted on the protective cover glass.

5. A headlight according to claim 4, wherein the coupling element is deformable.

6. A headlight according to claim 4, wherein the coupling element is breakable.

7. A headlight according to claim 5, wherein the coupling element is constituted by the lens holder itself.

8. A headlight according to claim 7, wherein the lens holder is breakable where it is fastened to the reflector.

9. A headlight according to claim 1, further comprising an energy absorbing foam located at least underneath the rigid module.

10. A motor vehicle, which includes a headlight according to claim 1.

11. A method of absorbing at least some of the energy arising from an impact between a pedestrian and a vehicle headlight, comprising the following steps:
   (a) absorption of some of the energy by deformation of a protective cover glass of the headlight,
   (b) absorption of part of the energy by displacement of an optical module comprising an elliptic type reflector, a converging lens and a lens holder coupled to the reflector and supporting the lens within the headlight, and
   (c) absorption of some of the energy by means of an absorbent foam.

12. A headlight for a motor vehicle, comprising:
   (a) a casing fixed on the vehicle,
   (b) a protective cover glass closing off the casing
   (c) an optical module comprising an elliptic type reflector, a converging lens and a lens holder coupled to the reflector and supporting the lens, the lens and the lens holder constituting a rigid module, and
   (d) at least one coupling element disposed between the lens holder and the reflector, which separates the rigid module with respect to the reflector when a sufficient impact force is exerted on the protective cover glass and the optical module.

13. A headlight according to claim 12, wherein the coupling element is deformable.

14. A headlight according to claim 12, wherein the coupling element is breakable.

15. A headlight according to claim 12, wherein the coupling element is constituted by the lens holder itself.

16. A headlight according to claim 15, wherein the lens holder is breakable where it is fastened to the reflector.

* * * * *